United States Patent [19]

Marstiller et al.

[11] Patent Number: 4,888,089

[45] Date of Patent: Dec. 19, 1989

[54] PROCESS OF MAKING AN ELECTRICAL RESISTANCE DEVICE

[75] Inventors: John A. Marstiller, Marston Mills; Paul H. Bodensiek, Waltham; Frederick G. Grise, Osterville, all of Mass.

[73] Assignee: Flexwatt Corporation, West Wareham, Mass.

[21] Appl. No.: 142,625

[22] Filed: Jan. 11, 1988

Related U.S. Application Data

[63] Continuation-in-part of Ser. No. 138,857, Dec. 29, 1987.

[51] Int. Cl.[4] .......... C23F 1/02; B22C 1/22; C03C 15/00; C03C 25/06

[52] U.S. Cl. .......... 156/644; 29/620; 156/656; 156/659.1; 156/902; 338/308; 427/102

[58] Field of Search .......... 427/101, 102, 103; 156/644, 656, 659.1, 901, 902; 338/308; 29/610.1, 611, 620, 621

[56] References Cited

U.S. PATENT DOCUMENTS

| | | | |
|---|---|---|---|
| 3,266,005 | 8/1966 | Balde et al. | 29/610.1 X |
| 3,287,161 | 11/1966 | Schwartz et al. | 427/102 |
| 3,664,013 | 5/1972 | MacGuire | 219/345 X |
| 3,704,359 | 11/1972 | Laing | 219/213 |
| 4,485,297 | 11/1984 | Grise et al. | 219/528 |

*Primary Examiner*—William A. Powell

[57] ABSTRACT

An electrical resistance device includes a conductive metal pattern carried on an insulating surface. A portion of the conductive metal pattern includes a two-dimensional array of areas devoid of conductive material ("voids") within a mesh of conductive material. Typically, the voids are hexagonal and are arranged such that the adjacent edges of adjacent hexagons are parallel to each other and spaced apart a distance not more than about 0.10 in. The hexagonal voids typically are arranged so that the centers of sets of three adjacent voids lie on the corners of equilateral triangles.

10 Claims, 1 Drawing Sheet

PROCESS OF MAKING AN ELECTRICAL RESISTANCE DEVICE

CROSS-REFERENCE TO RELATED APPLICATION

This application is a continuation-in-part of our application Ser. No. 138,857, filed Dec. 29, 1987 by Express Mail, Certificate No. B 94337118, and entitled ELECTRICAL HEATING DEVICE, which application is hereby incorporated by reference.

This invention relates to electrical resistance devices and, more particularly, to devices including a thin layer or film of conductive material on an insulating substrate.

BACKGROUND OF INVENTION

A number of different types of electrical devices are made by depositing a thin film of conductive material, for example, nickel or silver, on an insulating substrate, e.g., paper or organic plastic. The resistivity (ohms per square) of such a layer depends, of course, on the volume resistivity (ohm-centimeters) of the conductive material and the thickness of the layer. Using vacuum deposition procedures, it is possible to deposit a metal layer as thin as, perhaps, 35 to 40 Angstroms. A nickel layer of such a thickness has a resistivity of about 20 ohms per square.

On a commercial basis it is extremely difficult, if not impossible, to deposit uniform metal films at thicknesses significant less than about 35 Angstroms, and it accordingly also has not been feasible to produce uniform metal layers having a resistivity much greater than that of a uniform 35 Angstrom layer.

It also has been difficult to produce electrical devices in which the resistivity of the metal layer forming one area of the device is different from that of the metal layer forming another area.

SUMMARY OF INVENTION

We have discovered that the resistivity of an electric resistance device comprising a thin metal layer on an insulating substrate may be increased to substantially more than the resistivity of the layer itself by removing spaced portions of the metal so that the remaining metal defines a regular array of metal-free areas ("voids") within a metal mesh.

In preferred embodiments, the voids are hexagonal and are arranged with the centers of sets of three adjacent voids at the corners of equilateral triangles and with the edges of adjacent voids parallel to each other.

According to a preferred process, the mesh-void pattern is produced by first depositing a continuous metal layer of the desired thickness and then removing the metal in the desired "void" areas with an acid etching process.

DESCRIPTION OF PREFERRED EMBODIMENTS

Figure 1:
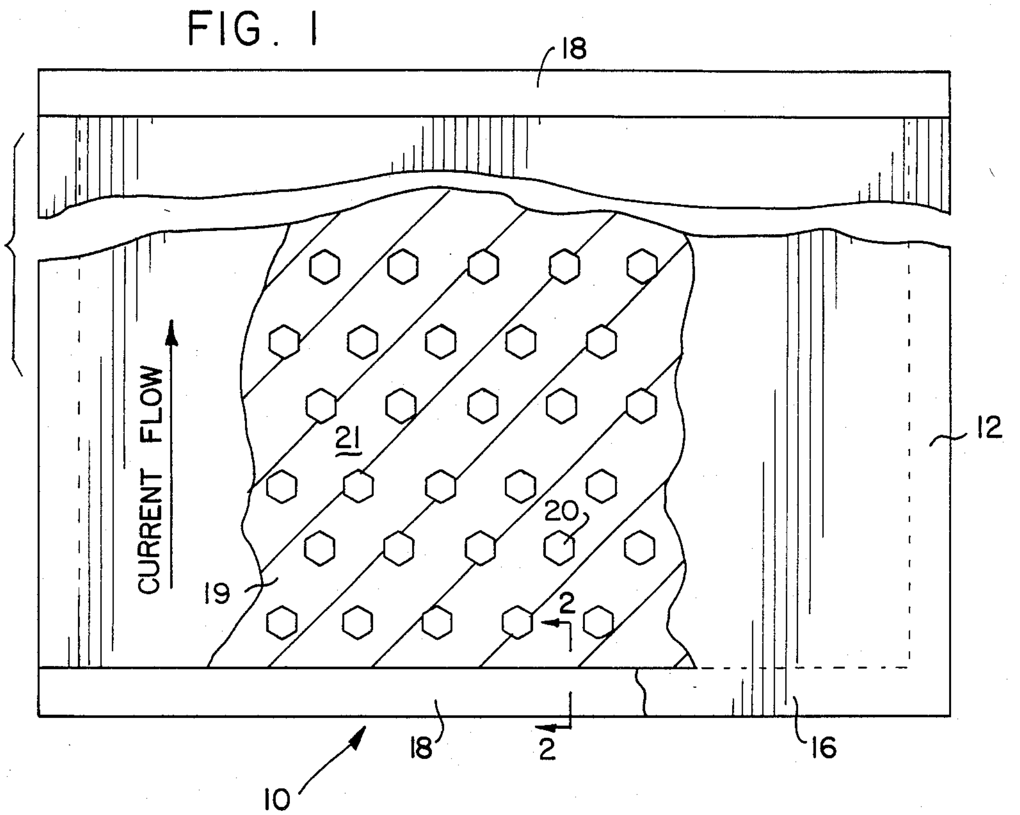
FIG. 1 is a plan view of an electrical resistance device embodying the present invention.
Figure 3:
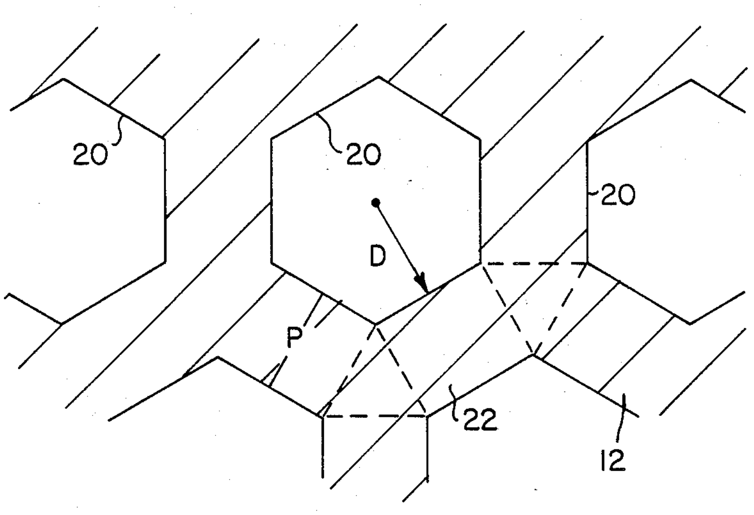
FIG. 3 is an enlarged plan view of a portion of the device of FIG. 1, more clearly illustrating the mesh-void pattern.
Figure 2:
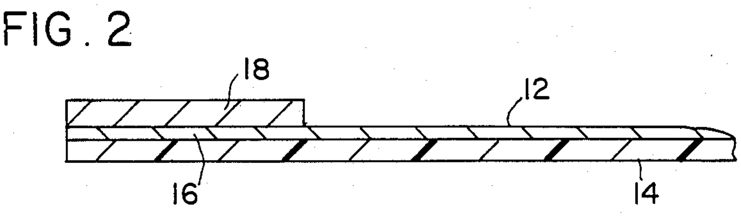
FIG. 2 is a section taken at line 2—2 of FIG. 1.

Referring now to FIGS. 1-3, there is shown an electrical resistance device, generally designated 10, comprising a metal pattern 12 deposited at essentially uniform thickness (i.e., about 35 Angstroms) on an organic plastic (e.g., polyester) substrate 14. Along the opposite side edges of device 10, metal pattern 12 comprises continuous conductor contact strips 16 about one-half inch wide. In the illustrated embodiment, a tinned copper conductor 18 overlies and is adhesively attached (e.g., with a conventional conductive adhesive) to each conductor contact strip 14. In other embodiments, the conductor contact strips may be deposited at a greater thickness than the remaining portion of the metal pattern, often in lieu of providing separate conductors.

As shown most clearly in FIGS. 1 and 3, the heating area 19 of device 10 (i.e., the portion between the spaced apart conductors 18 and conductor contact strips 16) comprises a regular rectilinear array of hexagonal voids 20 (i.e., hexagonally shaped areas that are free of metal or other conductive material) in a metal mesh pattern 21. The voids 20 are arranged on 0.375 in. centers, with the centers of strips of three adjacent voids at the corners of equilateral triangles (each leg of each triangle being 0.375 in. long). The triangles are arranged so that their sides are perpendicular to or form 30° angles with the direction of current flow, i.e., with a line extending transversely of device 10. The adjacent side edges of adjacent hexagonal voids are parallel to each other, and the size of the voids is such that the metal strip 22 between adjacent voids is about 0.005 inches wide (i.e., the size of each hexagon is such that the diameter of a circle within and tangent to the sides of the triangle is 0.370 in.).

The exact resistivity (ohms per square) of the heating area 18 should be determined empirically. To a close approximation, the resistivity (R) is given by the following formula:

$$1.732rD/W$$

where r is the resistivity (ohms per square) of the metal layer, and D and W are, respectively, the diameter of a circle inscribed within and tangent to hexagonal voids 20 and W is the width of the strip 22 between adjacent voids. Using the formula, it will be seen that resistivity (R) of the heating area 19 of device 10 is about 74r. If, as in the illustrated embodiment, the metal layer is nickel about 35A thick, r is about 20.5 ohms per square and R is about 1525 ohms per square.

In practice, the electrical device 10 of FIGS. 1-3 is made as follows:

a. Deposit a continuous metal layer of the desired thickness on substrate 14. In preferred practice the layer is deposited using a conventional vacuum deposition or metallization procedure.

b. Deposit an acid resist pattern over the continuous metal layer. The acid resist pattern is deposited such that resist material covers all the metal that is not to be removed (i.e., it covers conductor contact strips 16 and the metal mesh in heating area 19). The acid resist pattern may be deposited using any of a number of conventional techniques. For example, screen printing, rotograveure or flexo-graveure. Alternatively, a solid layer of acid resist may be deposited over the entire metal layer, and the pattern then produced by selectively removing portions of the resist using a conventional photoresist technique. Materials useful in forming the resist pattern include Blake Acid Resist from Cudner & O'Connor, Dychem (Type M or AX) film photoresist and Dupont (#4113) film photo resist.

c. Pass the device (with the resist plan pattern thereon) through an acid bath to remove all the metal layer that is not protected (i.e., covered) by the acid resist pattern (the remaining metal provides conductor contact strips 16 and mesh 21.

d. Remove the resist pattern.

e. Adhesively attach conductors 18.

OTHER EMBODIMENTS

Other embodiments may include a number of different heating areas of different resistivity. In such a device, for example, a pair of heating areas may be provided between the spaced-apart conductors. In one such area, the array of hexagonal voids may be as previously discussed with respect to the embodiment of FIGS. 1–3. In the other, the hexagonal voids may be arranged on different (e.g., 0.250 inch centers) and the width of the metal strips between adjacent voids may be different also (e.g., a width as small as about 0.001 in. may be produced using a photoresist process). In such a device, it will be seen that the two heating areas have different resistivities. One (that identical to that of the FIGS. 1–3 embodiment) will have a resistivity 74 times greater than that of the metal layer; in the other, the resistivity will be about 250 times that of the metal layer.

In other embodiments, other conductive materials (e.g., either metals such as silver or gold or other conductive compositions or dispersions) may be used in lieu of nickel, and different mesh-void patterns (e.g., those described in our above-referenced and incorporated application) Ser. No. 138,857 may be used.

These and other embodiments will be within the scope of the following claims.

What is claimed is:

1. In the method of making an electric resistance device in which a thin layer or film of metal is uniformly deposited on an insulating substrate, that improvement comprising the steps of thereafter selectively removing portions of the metal so deposited such that in a selected area of said device the remaining metal defines a conductive metal pattern comprising a two-dimensional regular array of areas devoid of conductive material ("voids") within a mesh of conductive material, said voids being arranged such that the centers of the voids forming a set of three adjacent voids are positioned at the corners of an equilateral triangle.

2. In the method of making an electric resistance device in which a thin layer or film of metal is uniformly deposited on an insulating substrate, that improvement comprising the steps of thereafter selectively removing portions of the metal so deposited such that in a selected area of said device the remaining metal defines a conductive metal pattern comprising a two-dimensional array of areas devoid of conductive material ("voids") within a mesh of conductive material, said voids being regularly spaced hexagons arranged such that the sides of adjacent hexagons are parallel to each other.

3. The method of claim 2 wherein the distance between the sides of adjacent hexagons in not more than about 0.010 in.

4. The method of claim 2 including the steps of forming an acid resist pattern over said metal layer, said resist pattern covering the portions of said metal layer that are not to be selectively removed, and thereafter passing said device through an acid bath to remove the portions of said metal layer that are not covered by said resist pattern.

5. The method of claim 2 including the step of selectively removing metal in a second portion of said device to form in said second portion a mesh-void pattern different from that in said first portion.

6. In the method of making an electric resistance device in which a thin layer or film of metal is uniformly deposited on an insulating substrate, that improvement comprising the steps of thereafter selectively removing portions of the metal so deposited such that in a selected area of said device the remaining metal defines a conductive metal pattern comprising a two-dimensional regular array of areas devoid of conductive material ("voids") within a mesh of conductive material, said voids being arrange such that the centers of the voids forming a set of three adjacent voids are positioned at the corners of a triangle and the overall direction of current flow in said device is not parallel to any of the sides of said triangle.

7. The method of claim 2 wherein the centers of the voids forming a set of three adjacent voids are positioned at the corners of an equilateral triangle.

8. The method of claim 2 wherein said metal is silver or nickel deposited at a thickness less than about 100 Angstroms.

9. The method of claim 6 wherein said triangles are equilateral triangles.

10. The method of claim 1 wherein said voids are regular polygons.

* * * * *